April 12, 1927.
H. W. PIERCE
1,623,972
PISTON AND PISTON PIN CONSTRUCTION
Filed June 12, 1924
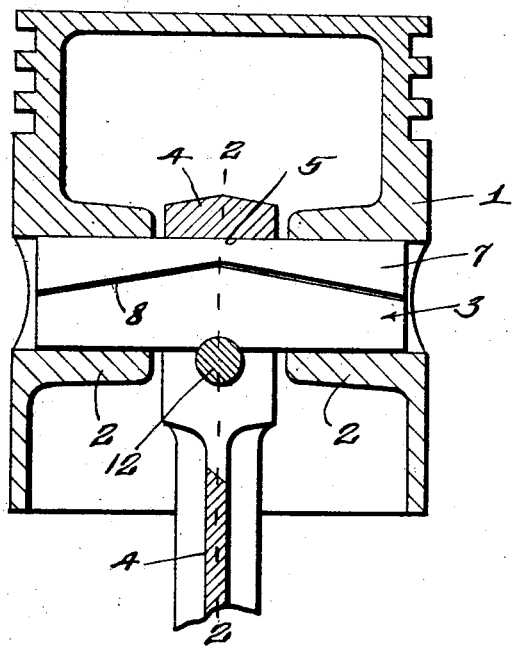
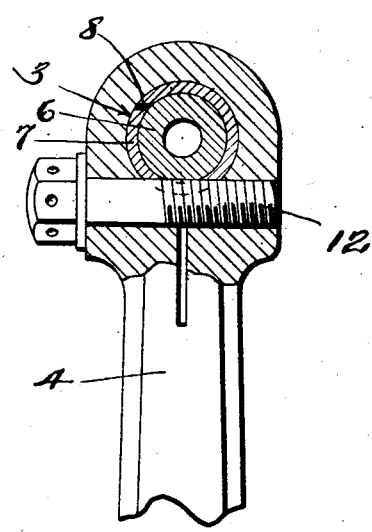
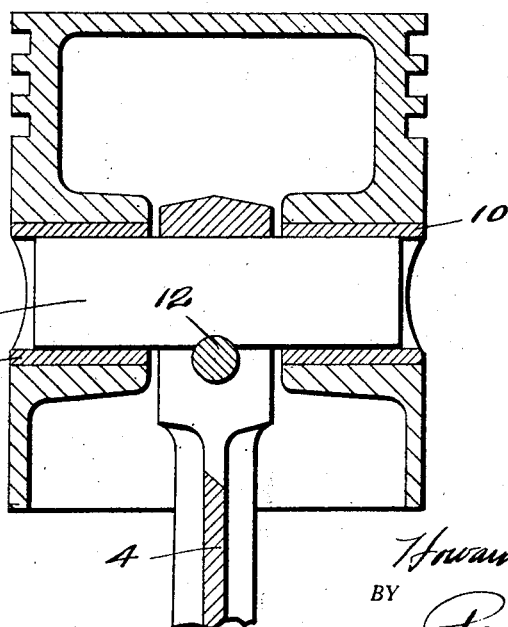
INVENTOR.
Howard W. Pierce
BY
Parsons & Bodell
ATTORNEYS.

Patented Apr. 12, 1927.

UNITED STATES PATENT OFFICE.

HOWARD W. PIERCE, OF BUTTE, MONTANA, ASSIGNOR TO LOUIS M. STELLMANN, OF ONONDAGA COUNTY, NEW YORK.

PISTON AND PISTON-PIN CONSTRUCTION.

Application filed June 12, 1924. Serial No. 719,669.

This invention relates to a construction of bearing for use where the temperature conditions to which the bearing is subject in its normal use, vary considerable, such as the bearings between the piston of an internal combustion engine and the piston pin and the connection rod, and has for its object particularly a bearing between pistons of a metal or metal alloy having high coefficient of expansion, such as so-called aluminum pistons, and a piston pin of a combination of metals different from the piston and suitable to coact with the bearings of an aluminum or alloy piston, all whereby a constant clearance is maintained at all varying temperatures to which the piston is subjected.

The invention consists in the novel features and in the combinations and constructions hereinafter set forth and claimed.

In describing this invention reference is had to the accompanying drawings in which like characters designate corresponding parts in all the views.

Figure 1 is a vertical sectional view of a piston provided with one embodiment of this invention.

Figure 2 is a transverse sectional view taken approximately on line 2—2, Fig. 1.

Figure 3 is a view similar to Fig. 1, of another form of this invention.

This bearing construction comprises generally the combination of two parts, one fitting in the other, the parts being of metals which owing to their ratio of expansion and contraction under varying temperature conditions, maintain a normal clearance under the varying temperature conditions to which the parts are subjected in their normal use, which clearance in other pistons varies widely at the various temperatures.

My invention is here shown as embodied in a piston construction for internal combustion or heat engines, which are subject, in normal use, to widely varying temperature conditions, as normal atmospheric temperature upon starting of engine when cold, to the maximum temperature under which the engine operates, the piston being one of the bearing construction and the parts of the other of the parts.

1 designates the piston formed of a metal of relatively high coefficient of expansion as aluminum or aluminum alloy. The body of the piston is formed with piston pin bearings or pin bosses 2. 3 is the piston pin having a bearing in or fitting in the pin bosses; and 4 is the connecting rod having a bearing 5 on the pin 3 between the pin bosses 2.

As is well known to those skilled in the art, it is impractical to work together two parts of the same metal, one on the other, as steel on steel, or aluminum on aluminum, or brass on brass, etc., and that two different metals of even slightly different character will under the widely varying temperatures, under which an internal combustion engine operates, develop widely varying clearances, especially when the piston is of metal as aluminum having a relatively high coefficient of expansion.

The pin 3 is preferably formed of two metals combined to have the same expansion ratio as that of the piston under the varying temperatures, and usually the pin is formed with a core 6 of aluminum and an outer shell which is mechanically expansible and contractible to compensate for variations that would otherwise occur between the shell and the pin bosses 2.

7 designates the shell or sleeve which is usually of steel or any other mechanically expansible or contractible metal, the sleeve being slotted lengthwise as at 8 to render it mechanically expansible and contractible, it expanding under the thermal expansion of the core 6 and contracting on the core under the contraction of the pin bosses 2. It also expands under the influence of the core 6 to fit the bearing 5 of the aluminum connecting rod 4, and contracts under the influence of the contractile bearing 5. Hence, the clearance between the pin 3 and the pin bosses and the connecting rod bearing will remain substantially the same during all the varying temperatures to which they are subjected when embodied in an internal combustion engine or other heat engine.

In Figure 3 the piston pin 9 instead of being formed of two metal parts mechanically assembled may be formed as a unit of a combination of metals, that is, a metal alloy, the metals of which are so proportioned as to have the same expansion ratio as that of the aluminum piston, or a piston of any other metal having relative high coefficient of expansion. In such cases the pin may be of aluminum alloy, bronze, etc.

The pin may be mounted directly in the pin bosses 2 or in a bushing as shown at 10, also the connecting rod bearing 5 may be loose, that is, may have a rocking movement relatively to the pin or may be clamped thereto as by a screw 12, in the usual manner.

Owing to this construction of bearing for piston and piston pins, the clearance between the pin and pin bosses and connecting rod bearing will remain substantially constant during all temperatures of the engine, and hence, there will develop no undue looseness, noise, and knocks during the operation of the engine.

What I claim is:

1. In a piston, the combination of a piston body of a metal having a relatively high coefficient of expansion, the piston body being formed with pin bosses, a piston pin mounted in the bosses, and a connecting rod having a bearing mounted on the pin, the pin being of a different combination of metals from that of the piston, and having the same ratio of expansion as the piston, whereby a constant clearance is maintained between the pin, the pin bosses and the connecting rod bearing at all temperatures.

2. In a piston construction for internal combustion engines, a piston body of a metal having a relatively high coefficient of expansion, the piston body being formed with pin bosses, a piston pin comprising a core of metal having a relatively high coefficient of expansion, and a mechanically expansible and contractile sleeve fitting the core and said bosses, and being mechanically expansible by the thermal expansion of the core and mechanically contractile by the contraction of the pin bosses, and acting to maintain a constant clearance between the pin and the piston bosses and the connecting rod bearing at all temperatures of the engine.

3. In a piston construction, the combination of a piston body of a metal having a relatively high coefficient of expansion, the body being formed with pin bosses, a piston pin mounted in the bosses and a connecting rod having a bearing on the pin and formed of metal expansible and contractile at the same ratio of expansion as the metal of the piston body, the pin being formed of a combination of metals having the same ratio of expansion as the pin bosses and the connecting rod bearing, whereby a constant clearance is maintained between the pin and the pin bosses and the connecting rod bearing at all temperatures of the engine.

In testimony whereof, I have hereunto signed my name, at Butte, in the county of Silver Bow, and in State of Montana, this 28th day of May, 1924.

HOWARD W. PIERCE.